United States Patent
Fenton et al.

(10) Patent No.: US 8,090,940 B1
(45) Date of Patent: Jan. 3, 2012

(54) METHOD AND SYSTEM FOR VERIFYING IDENTIFICATION OF AN ELECTRONIC MESSAGE

(75) Inventors: James L. Fenton, Los Altos, CA (US); Michael A. Thomas, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 1113 days.

(21) Appl. No.: 11/143,362

(22) Filed: Jun. 1, 2005

Related U.S. Application Data

(63) Continuation-in-part of application No. 10/859,402, filed on Jun. 1, 2004, now Pat. No. 7,437,558.

(51) Int. Cl.
*H04L 29/06* (2006.01)

(52) U.S. Cl. ........ 713/160; 713/176; 713/181; 709/206; 709/223; 709/229

(58) Field of Classification Search .......................... None
See application file for complete search history.

(56) References Cited

U.S. PATENT DOCUMENTS

| | | | |
|---|---|---|---|
| 6,073,242 A | 6/2000 | Hardy et al. | |
| 6,292,897 B1 | 9/2001 | Gennaro et al. | |
| 6,567,913 B1 | 5/2003 | Ryan, Jr. | |
| 6,584,564 B2 | 6/2003 | Olkin et al. | |
| 6,643,684 B1 | 11/2003 | Malkin | |
| 6,760,752 B1 | 7/2004 | Liu et al. | |
| 6,986,037 B1 | 1/2006 | Assmann | |
| 7,065,547 B2 | 6/2006 | Persels et al. | |
| 7,069,443 B2 | 6/2006 | Berringer et al. | 713/180 |
| 7,072,944 B2 * | 7/2006 | Lalonde et al. | 709/206 |
| 7,127,606 B2 | 10/2006 | Wheeler et al. | |
| 7,191,468 B2 * | 3/2007 | Hanner | 726/13 |
| 7,483,950 B2 * | 1/2009 | Little et al. | 709/206 |
| 2002/0032853 A1 | 3/2002 | Preston et al. | |
| 2003/0158961 A1 | 8/2003 | Nomura et al. | |
| 2003/0236847 A1 * | 12/2003 | Benowitz et al. | 709/206 |
| 2004/0162980 A1 * | 8/2004 | Lesenne et al. | 713/153 |
| 2004/0196968 A1 * | 10/2004 | Yue | 379/210.02 |
| 2004/0250122 A1 | 12/2004 | Newton | |
| 2005/0055410 A1 | 3/2005 | Landsman et al. | |
| 2005/0129021 A1 * | 6/2005 | Kumar et al. | 370/392 |
| 2005/0172004 A1 | 8/2005 | Fisher | |

OTHER PUBLICATIONS

Lentczner, Mark, et al.; "Sender Policy Framework (SPF) . . . "; Feb. 2003; www.ietf.org/internet-drafts/draft-jnengwong-spf-00.txt.
Microsoft Corporation; "Caller ID for E-Mail: The Next Step to Deterring Spam"; Feb. 12, 2004; Microsoft.
Microsoft Corporation; "Protecting Domain Names from Spoofing . . . "; Feb. 20, 2004; Microsoft.
Network Working Group; Qualcomm; P. Resnick, ed; "Internet Message Format"; Apr. 2001; ftp://ftp.isi.edu/in-notes/rfc2822.txt.
Stolowitz Ford Cowger LLP; Apr. 5, 2010; Listing of Related Cases; 1 Page.

* cited by examiner

*Primary Examiner* — Nasser Moazzami
*Assistant Examiner* — Fikremariam A Yalew
(74) *Attorney, Agent, or Firm* — Stolowitz Ford Cowger LLP

(57) ABSTRACT

An electronic message is accessed. The message comprises a number of headers and a signature comprising a digital signature and a version of the headers. The message is verified based on analysis of the version of the headers and the digital signature. The version of the headers is compared with the headers and a policy is applied based on results of the comparison to determine further processing of the electronic message.

20 Claims, 6 Drawing Sheets

METHOD AND SYSTEM FOR VERIFYING IDENTIFICATION OF AN ELECTRONIC MESSAGE

RELATED APPLICATION

This application is a continuation-in-part of U.S. patent application entitled, "A method and system for verifying identification of an electronic mail message," to Fenton et al., application Ser. No. 10/859,402, filed on Jun. 1, 2004 now U.S. Pat. No. 7,437,558, which application is hereby incorporated in its entirety by reference.

FIELD OF INVENTION

The present invention relates to the field of electronic communication. Specifically, the present invention relates to a method, device, and system for verifying identification of an electronic message.

BACKGROUND OF THE INVENTION

The use of electronic messages, such as e-mail, allows users anywhere in the world to communicate with each other. In recent years, Internet users have been subjected to a torrent of unwanted e-mail messages. These unwanted messages generally take two forms: 1) messages originated by "spammers" to send advertising or solicitation, or as part of a confidence scheme, and 2) messages sent automatically by worms and other malicious software (malware) attempting to infect additional systems. In both cases, a large proportion of the messages attempt to disguise their true source to frustrate attempts to shut down the spammer, to disguise the identity of the infected system sending the message, or to support a social-engineering goal.

In an effort to reduce or eliminate the transmission of unwanted e-mail messages, various approaches have been proposed to verify the identity of the return address of an e-mail. However, current return address verification approaches suffer from various drawbacks that affect their implementation and usability. One approach is a path-based approach for attempting to verify the identity of the sender by verifying the Internet Protocol (IP) address of the message source. An e-mail recipient performs a Domain Name System (DNS) query to determine what addresses are used for outgoing mail servers of the domain as listed by the sender (e.g., for the e-mail address joesmith@example.com, example.com is the domain). If the message source is not from an outgoing mail server of the domain, it is determined that the identity of the return address is forged.

However, the path-based approach provides an incomplete solution to identity verification of an e-mail. For example, an authorized third party may send e-mail messages on behalf of a business. The third party may be authorized to send emails as an agent of the business, but not from the business' internal network. Businesses do not want to authorize third parties to send emails from their network, so as to not expose their network to the third parties. Furthermore, professional organizations, alumni associations, and other affinity domains may provide e-mail addresses to users. In both of these cases, a recipient may receive an e-mail supposedly coming from one domain, but the path indicates the e-mail actually came from another domain. The path-based approach would not be able to verify the sender of the e-mail in these cases. Moreover, path-based schemes can only identify a sender down to the domain level, not to the individual senders. In general, path-based identification schemes break some of the common ways e-mail is used, and are not always effective in filtering unwanted e-mail messages.

Signature-based identification schemes are also used to verify the sender of an e-mail. Pretty Good Privacy (PGP) and Secure Multipurpose Internet Mail Extensions (S/MIME) are examples of signature-based identification schemes. In general, signature-based schemes verify a message signature embedded in the message. If there is a modification to the signed content, the verification may fail. Some modifications to the signed content may be permissible, however. Therefore, signature-based approaches may result in authentic messages failing authentication.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1:
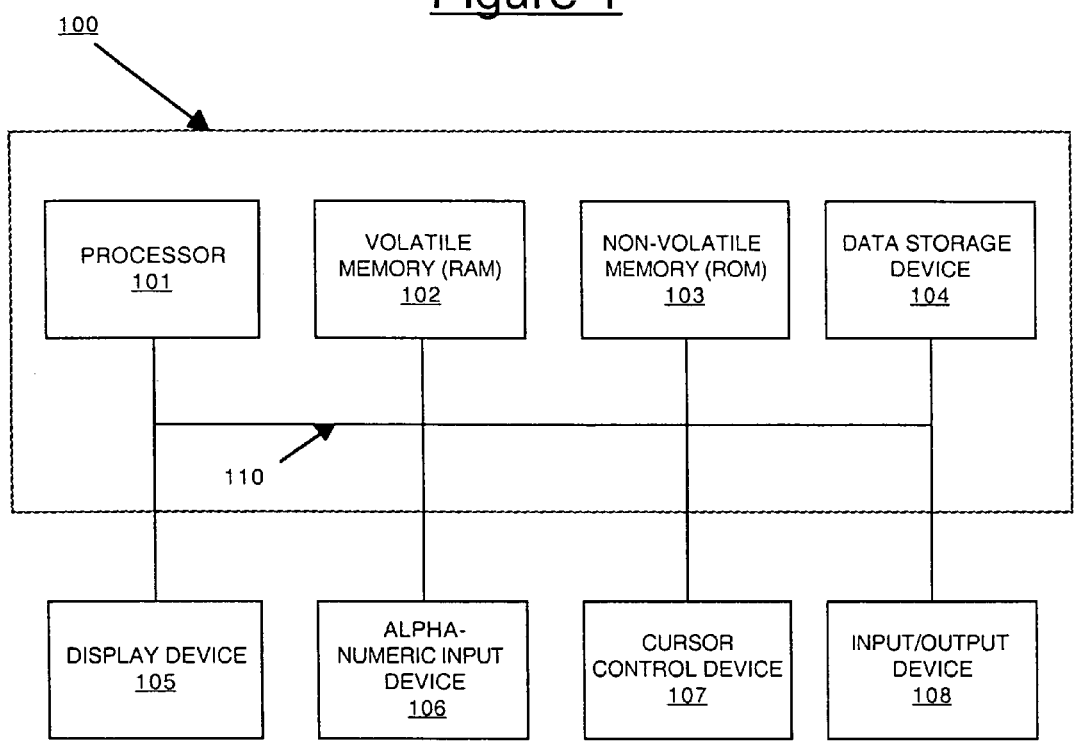
FIG. 1 is a block diagram of an exemplary computer system platform upon which embodiments of the present invention may be practiced.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and the scope of the invention as defined by the appended claims. Furthermore, in the following detailed description of the present invention, numerous specific details are set forth in order to provide a thorough understanding of the present invention. However, it will be apparent to one skilled in the art that the present invention may be practiced without these specific details. In other instances, well-known methods, procedures, components, structures and devices have not been described in detail so as to avoid unnecessarily obscuring aspects of the present invention.

Various embodiments of the present invention, a method, system and device for verifying identification of an electronic message, are described herein. The electronic message may be an electronic mail (e-mail), although the present invention is not so limited. For example, in one embodiment, the electronic message may be part of a signaling protocol, such as SIP (Session Initiation Protocol), which may be used to signal Internet conferencing, IP telephony, events notification and instant messaging.

Embodiments of the present invention verify the authenticity of a received electronic message using a signature in the message. The signature may identify a domain from which the message purportedly originated. The message may contain a key for verifying the signature or the message may indicate where a key may be obtained. Embodiments of the present invention test for whether the message was modified since it was last trusted as being authentic. If so, the modifications are identified, wherein steps can be taken based on an analysis of the modification. Thus, the present invention allows a message that has been modified since it was last trusted to be sent on to its intended recipient provided the modification are acceptable.

Exemplary Computer System Platform

Some portions of the detailed descriptions that follow are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here and generally conceived to be a self-consistent sequence of steps of instructions leading to a desired result. The steps are those requiring physical manipulations of data representing physical quantities to achieve tangible and useful results. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "receiving", "accessing", "verifying", "generating", "performing", "determining", "signing", "adding", "registering", or the like, refer to the actions and processes of a computer system or similar electronic computing device. The computer system or similar electronic device manipulates and transforms data represented as electronic quantities within the computer system's registers and memories into other data similarly represented as physical quantities within the computer system memories into other data similarly represented as physical quantities within the computer system memories or registers or other such information storage, transmission, or display devices.

Refer now to FIG. 1 that illustrates an exemplary computer system 100 upon which embodiments of the present invention may be practiced. In general, computer system 100 comprises bus 110 for communicating information, processor 101 coupled with bus 110 for processing information and instructions, random access (volatile) memory (RAM) 102 coupled with bus 110 for storing information and instructions for processor 101, read-only (non-volatile) memory (ROM) 103 coupled with bus 110 for storing static information and instructions for processor 101, data storage device 104 such as a magnetic or optical disk and disk drive coupled with bus 110 for storing information and instructions.

In one embodiment, computer system 100 comprises an optional user output device such as display device 105 coupled to bus 110 for displaying information to the computer user, an optional user input device such as alphanumeric input device 106 including alphanumeric and function keys coupled to bus 110 for communicating information and command selections to processor 101, and an optional user input device such as cursor control device 107 coupled to bus 110 for communicating user input information and command selections to processor 101. Furthermore, an optional input/output (I/O) device 108 is used to couple computer system 100 onto, for example, a network.

Display device 105 utilized with computer system 100 may be a liquid crystal device, cathode ray tube, or other display device suitable for creating graphic images and alphanumeric characters recognizable to the user. Cursor control device 107 allows the computer user to dynamically signal the two-dimensional movement of a visible symbol (pointer) on a display screen of display device 105. Many implementations of the cursor control device are known in the art including a trackball, mouse, joystick or special keys on alphanumeric input device 106 capable of signaling movement of a given direction or manner of displacement. It is to be appreciated that the cursor control 107 also may be directed and/or activated via input from the keyboard using special keys and key sequence commands. Alternatively, the cursor may be directed and/or activated via input from a number of specially adapted cursor directing devices.

Key Management

Figure 2:
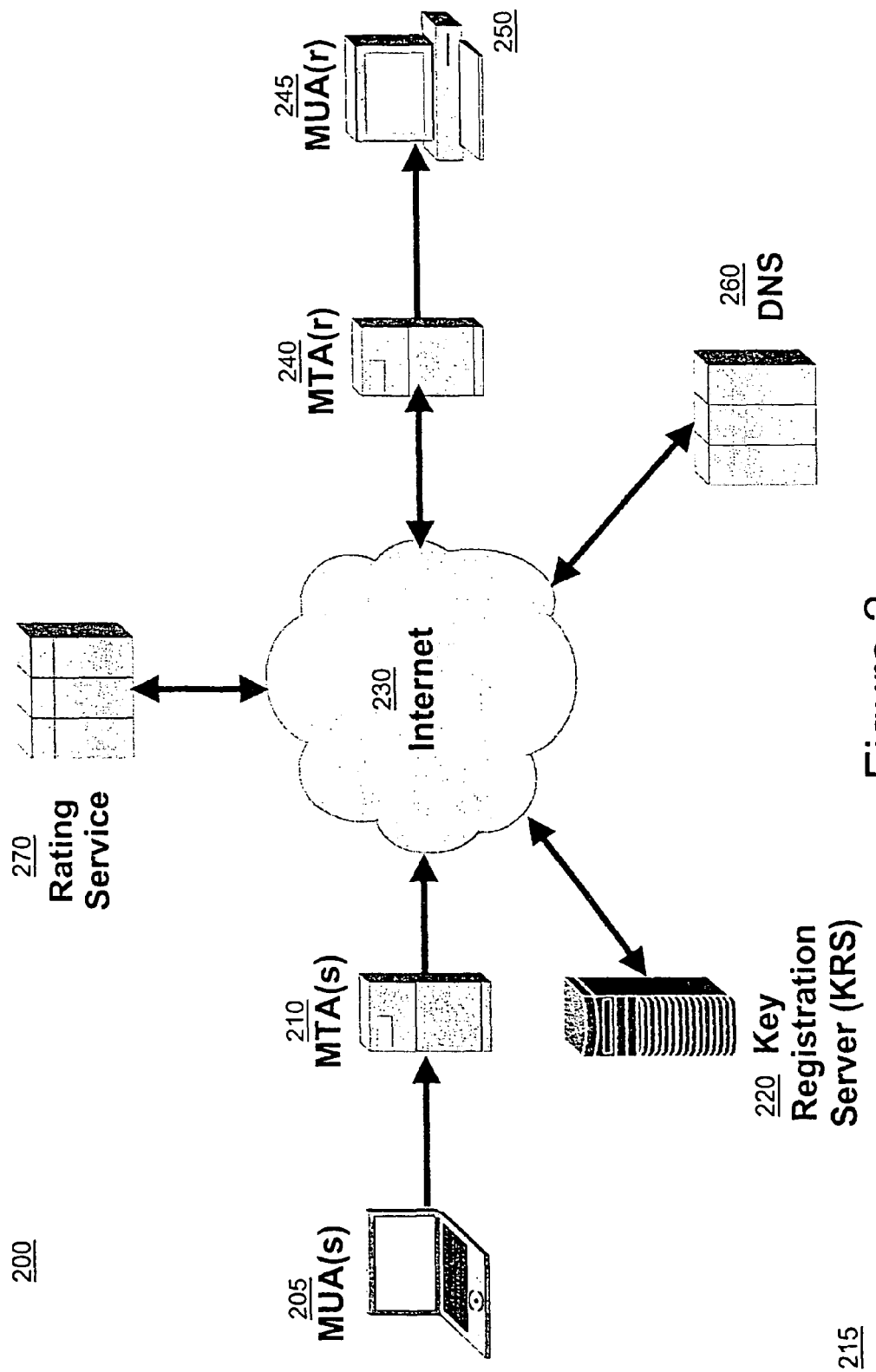
FIG. 2 is a block diagram of one embodiment of a system for verifying identification of an electronic mail message, in accordance with one embodiment of the present invention.

Referring now to FIG. 2, a block diagram of a system 200 for verifying identification of an e-mail message, in accordance with one embodiment of the present invention. As depicted in FIG. 2, system 200 includes mail user agent (MUA) 205, mail transfer agent (MTA) 210, MTA 240, MUA 245, key registration server (KRS) 220, Domain Name System (DNS) 260, and rating service 270. System 200 is operable to perform message transmission for a sender to a receiver. In one embodiment, components of system 200 are operable to perform a method for verifying identification of an e-mail message.

In one embodiment, MUA 205, MTA 210, MTA 240, MUA 245, KRS 220, DNS 260, and rating service 270 are comprised within separate computer systems (e.g., computer system 100 of FIG. 1) dispersed across Internet 230. In one embodiment, the components of system 200 communicate via the communications protocols of system 200. In one embodiment, MUA 205 may communicate to MTA 210 and MTA 210 may communicate to MTA 240 via simple mail transfer protocol (SMTP). In one embodiment, MTA 240 may communicate to KRS 220 and rating service 270 via hypertext transport protocol (HTTP). In one embodiment, MTA 240 may communicate to MUA 245 via post office protocol (POP) or Internet message access protocol (IMAP). It should be appreciated that any protocol that supports communication between computing systems may be used, and that embodiments of the present invention are not limited by the described embodiments.

MUA 205 is an application that supports user interaction with an e-mail system for sending and receiving e-mail messages. In one embodiment, MUA 205 is a software application resident on a computer system. In another embodiment, MUA 205 is a Web-based e-mail application accessible over the Internet. MTA 210 is an application that transmits an e-mail message through a network to a destination mail server. MUA 205 and MTA 210 are associated with domain 215, in which a domain is an organization's unique name on the Internet.

An e-mail message generated at MUA 205 is transmitted by MTA 210 to a destination mail server. Prior to transmission, the e-mail message is signed using a private key of a public/private key pair, wherein the signature is included in the e-mail message header. The signature can be verified by using the public key of the key pair. The public key may be added to the e-mail message header. In one embodiment, MUA 205 is operable to sign the e-mail message and add the public key to the message header. In another embodiment, MTA 210 is operable to sign the e-mail message and add the public key to the message header. By placing the signature generation and public key addition in MTA 210, it is not necessary to initially support this functionality in MUA 205, thereby speeding deployment and reducing technical support demands. However, MUA support may be added to increase e-mail verification flexibility. In another embodiment, a key identifier is added to the message header rather than the entire public key, to reduce the overall size of the e-mail message. The key identifier may identify a public key from KRS 220. Alternatively, the public key may be located using the DNS.

MTA 210 is operable to transmit an e-mail message, which includes a signature and a public key in the message header, to MTA 240. MTA 240 is operable to receive the e-mail message and to verify the authorization of the public key. In order for the signature to be meaningful, a trusted database of public keys needs to be available to verify message signatures. A KRS may be considered authoritative to verify the association of a key with any e-mail address in a domain. Accordingly, KRS 220 associated with domain 215 is accessed to verify the authorization of the public key. In one embodiment, MTA 240 accesses DNS 260 to perform a DNS lookup to locate the address of KRS 220. In one embodiment, the DNS lookup is based on the domain name listed in the return address of the e-mail message (e.g., example.com for the e-mail address joesmith@example.com). In another embodiment, the DNS lookup is based on the domain name listed in the message header.

DNS 260 is operable to return an IP address for the KRS (e.g., KRS 220) associated with the domain name listed in the e-mail address to MTA 240. KRS 220 stores registered keys for domain 215. It should be appreciated that KRS 220 may store registered keys for any number of domains, and is not limited to a single domain. For example, a domain may outsource public key management to a third party KRS. MTA 240 is operable to verify the authorization of the public key received in the e-mail message against registered keys stored in KRS 220.

In one embodiment, KRS 220 determines a value indicating a trust level of the public key according to domain 215. In one embodiment, the value indicates whether a public key is valid (e.g., good rating), a public key is unregistered (e.g., it is unknown), or it is invalid (e.g., public key is associated with a known stolen computer). In one embodiment, the value is based on a key fingerprint (e.g., a cryptographic hash) of the public key. MTA 240 is configured to determine the authorization of the key based on the value. Based on the particular settings of MTA 240, a public key can be determined as valid or invalid. In one embodiment, if the public key is invalid, the e-mail message is dropped.

Even if a key is determined to be valid, the e-mail message may be an unwanted message (e.g., spam or a virus), as senders of unwanted messages may be able to register their own domain. Therefore, it may be desirable to have an independent rating service for rating the security level of a domain and/or a particular user. For example, a domain may be known to have low reliability for preventing unwanted e-mail. In one embodiment, system 200 includes rating service 270 for determining a security rating associated with the sender of the e-mail message. In one embodiment, rating service 270 is a third party service that provides independent ratings of the security provided by a domain and/or individual user address.

MTA 240 is operable to transmit a rating request to rating service 270. In one embodiment, rating service 270 returns a security rating associated with a sender of the electronic mail message. In another embodiment, rating service 270 returns a security rating associated with the domain. It should be appreciated that rating service 270 is optional.

MTA 240 is operable to verify the signature based on the public key. In one embodiment, MTA 240 is also configured to verify the identification of the message based on the signature and the public key. In another embodiment, MTA 240 is also configured to verify the identification of the message based on the signature, the public key and the security rating as received from rating service 270. If the identification of the message is verified, the message is transmitted to MUA 245, for receipt by the intended recipient. In contrast, if the identification of the message is not verified, the message is tagged with the authorization of the identification and, if applicable, the security rating of the sender. In another embodiment, the message may be determined to be an unwanted e-mail message, and is not forwarded to the intended recipient. It should be appreciated that other policies (such as returning a temporary failure until it is convenient to accept an unidentified message) are possible as well. Also, it is possible for MUA 245 to check the authorization (and optionally the security rating) of the message itself.

Figure 3:
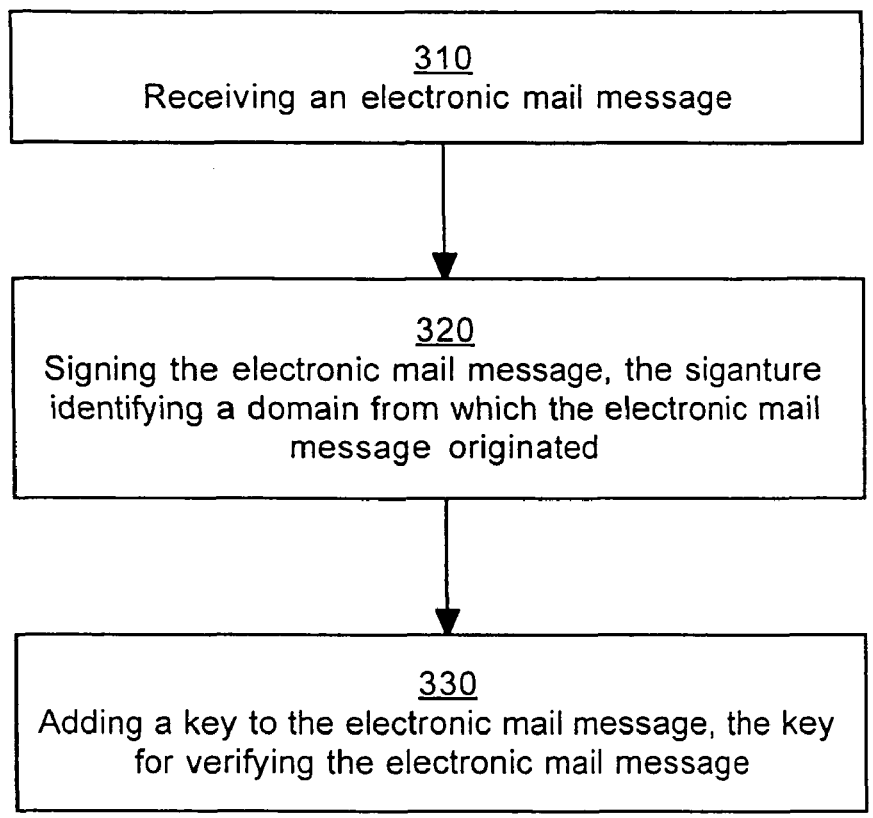
FIG. 3 is a flow chart illustrating a method for generating a self-verifying electronic mail message, in accordance with one embodiment of the present invention.

FIG. 3 is a flow chart illustrating a process 300 for generating a self-verifying electronic mail message, in accordance with one embodiment of the present invention. In one embodiment, process 300 is carried out by processors and electrical components under the control of computer readable and computer executable instructions. The computer readable and computer executable instructions reside, for example, in data storage features such as computer usable volatile and non-volatile memory (e.g., volatile memory 102 and non-volatile memory 103 of FIG. 1). However, the computer readable and computer executable instructions may reside in any type of computer readable medium. Although specific steps are disclosed in process 300, such steps are exemplary. That is, the embodiments of the present invention are well suited to performing various other steps or variations of the steps recited in FIG. 3. In one embodiment, process 300 is performed by MUA 205 of FIG. 2. In another embodiment, process 300 is performed by MTA 210 of FIG. 2.

At step 310 of process 300, an e-mail message is received. The e-mail message may be generated at an MUA (e.g., MUA 205 of FIG. 2). At step 320, a signature for the electronic mail message is generated (e.g., the message is signed). The signature is generated using a private key of a public/private key pair. In one embodiment, the signature identifies the domain from which the electronic mail message originated. In one embodiment, the signature is added to a header of the e-mail message.

At step 330, the public key of the key pair is added to the e-mail message, wherein the public key is for verifying the signature. In another embodiment, a key identifier identifying the public key is added to the e-mail message. It should be appreciated that steps 310, 320 and 330 may be performed at either a MTA or a MUA. In one embodiment, the public key is added to a header of the e-mail message. In another embodiment, the public key and signature may be contained within the same e-mail message header.

The signature header including the public key is included in an e-mail message in order for it to be considered a self-verifying mail message. For example, the signature header may have the syntax:

signature="X-IMAIL-SIG:" signature-text CRLF

The signature-text may include a number of fields that represent the signature itself, a public key used to create the signature, and related information. An example of a signature is as follows:

X-IMAIL-SIG: v:"1"; h:"thomasm-u1"; d:"cisco.com"; t:"1080771772.862325"; x:"1081203772"; a:"rsa-sha1"; e:"lw=="; 
n:"pZORwkeEetQnTVC7tw5MIE+31ROt/sGv5q+dxuwUllqu5XKSva4P1/anPgliz"
"7K8V0MaRDwDjKluYYGaUO5ldDNfE7WEKe+/r8k3D0lrkNCa8qNPDS KljocN6y"
"d7Wjmx/Hk+tquACcpwhhDyVxzlBcj/A5aCApbeFeRkVvfFH70=";
s:"T3iRhynnuKx8+UNBuxMnDClFet8RTM+VAs+STKM4P9ZqiEaUmG1r XmeXq3T+8"
"0oHhWtztZob/2twTxiqzgMD5MnFOTaqujJUBOmklf1VR+ELzKq/vPZ+G mWs+h"
"mtSg3sH7jWrnvYHQpT6yey9TumnJVAdWepPI4 budT9GFdpRuw=";
c:"Subject: new tags"

Tags and their values in the X-IMAIL-SIG line are included into the cryptographic hash with the sole exception of the s: (signature) tag and its value. The tags and their values are simply concatenated to each other when forming the cryptographic hash in the order they are present in the X-IMAIL-SIG line. That is: "v1hthomasm-u1dcisco.com[ . . . ]". Syntactic markers are not included and the value used in the hash is before encoding/after decoding. The final hash algorithm is as follows:

TRUNC(SHA1(SIGTAGVALS,SHA1(BODY)),12)

where SIGTAGVALS is the encoding described above for the header tags/values and BODY is the SHA-1 hash of the body of the e-mail itself. In one embodiment, the SHA-1 value of the body uses the full 16 bytes of the hash (e.g., is not truncated). Examples of the tags used in the signature are as follows:

a: Algorithm—One-way hash and public key algorithm. In one embodiment this is rsa-sha1.

c: Copied header—A copied header is a header which the sender would like to cryptographically sign. In one embodiment, there are no other headers into the cryptographic hash. The headers which are copied into the signature line are purely at the discretion and local policy of the signer. In one embodiment, the headers copied include the Subject, From, and Date headers. Receiving MTAs and/or MUAs may choose to replace the unsigned headers with headers which have been signed so as to present untampered with headers to the user, typically the headers copied from the originating domain. If such a replacement is performed, the unsigned headers may be preserved in the message (e.g., X-UNSIGNED-HEADER).

d: Domain of signer—This tag denotes the signing domain. It is used to inform the receiver of the appropriate level of address that is considered the authoritative domain in this context. For example, if a message is received from jdoe@eng.example.com, the d: tag might indicate that the domain is example.com or eng.example.com. If this tag does not correspond to either the hostname of the envelope-from address or a higher-level domain, the signature may be ignored.

e: The Rivest-Shamir-Adelman (RSA) public exponent of the supplied signing key, base 64 encoded.

h: Signing host.

n: The RSA public modulus of the supplied signing key, base 64 encoded. It should be appreciated that the key length is implicit with the number of decoded bits in the modulus. For example, supported key lengths may be 768 bits, 1024 bits and 1536 bits.

s: The RSA signature over the computed one-way hash, base 64 encoded.

t: Timestamp—The time that this signature was created. In one embodiment, the format is the standard Unix seconds-since-1970 followed by a fractional number. In one embodiment, the time stamp is unique for this signing key. The intent of the fraction is to the guarantee the uniqueness of any given signature at any particular instance. The value may be expressed as an unsigned integer.

x: Signature expiration in seconds-since-1970 format—In one embodiment, signatures are not considered valid if the current time at the receiver is past the expiration date. The value may expressed as an unsigned integer.

v: Version of these tags—In one embodiment this is set to "1". The value may expressed as an unsigned integer.

In one embodiment, the e-mail message also includes an optional verification header which is used to convey the verification of a message from an MTA to an MUA or another MTA within the same trust domain. If used, it is applied by an MTA that is close to the point where an MTA or the recipient's MUA applies policy based on the verification status of the message. The verification header indicates whether an MTA was able to successfully verify the message according to whatever policies it decides to use. A recipient MUA or MTA may decide to rely on the presence of a verification header in applying policy to the message (e.g., moving an unverified message to a lower-priority folder), or it may do such verification locally.

In one embodiment, the verification header is not cryptographically protected, in order to avoid the need to manage keys for MTAs. The verification header may be deleted from the header when the message is sent via SMTP outside the trust domain of the sender. In one embodiment, the verification header is discarded if it received from an SMTP peer that is not trusted by the recipient (e.g., an SMTP peer that is not within the recipient's administrative control).

An example of a verification header is as follows:

X-IMAIL-VERIFY: s:"y"; v:"y"; r:"68"; h:"imail.example.com"

Examples of the tags and values used by the verification header are as follows:

s: Signature—The value is "y" if there is a signature line from the sending domain (e.g., the domain suffix in the envelope from). Otherwise the value is "n".

v: Verify—The value is "y" if the home domain's signature is both present and the public key operation verifies correctly.

r: Rating—The value here is between −127 and 127 with negative values expressing an adverse rating, zero being neutral and positive values indicating a favorable rating. The rating value is at the discretion of the entity supplying the X-IMAIL-VERIFY header and may take into account many different factors including the rating supplied by the home domain's KRS, local and third party ratings, and any other factors the verifying entity considers relevant.

h: Host—This is the fully qualified domain name of the MTA that performed the verification. It should be noted that since the X-IMAIL-VERIFY header is not cryptographically protected, users or subsequent MTAs which make use of the X-IMAIL-VERIFY header independently ensure that it is not subject to tampering.

Figure 4:
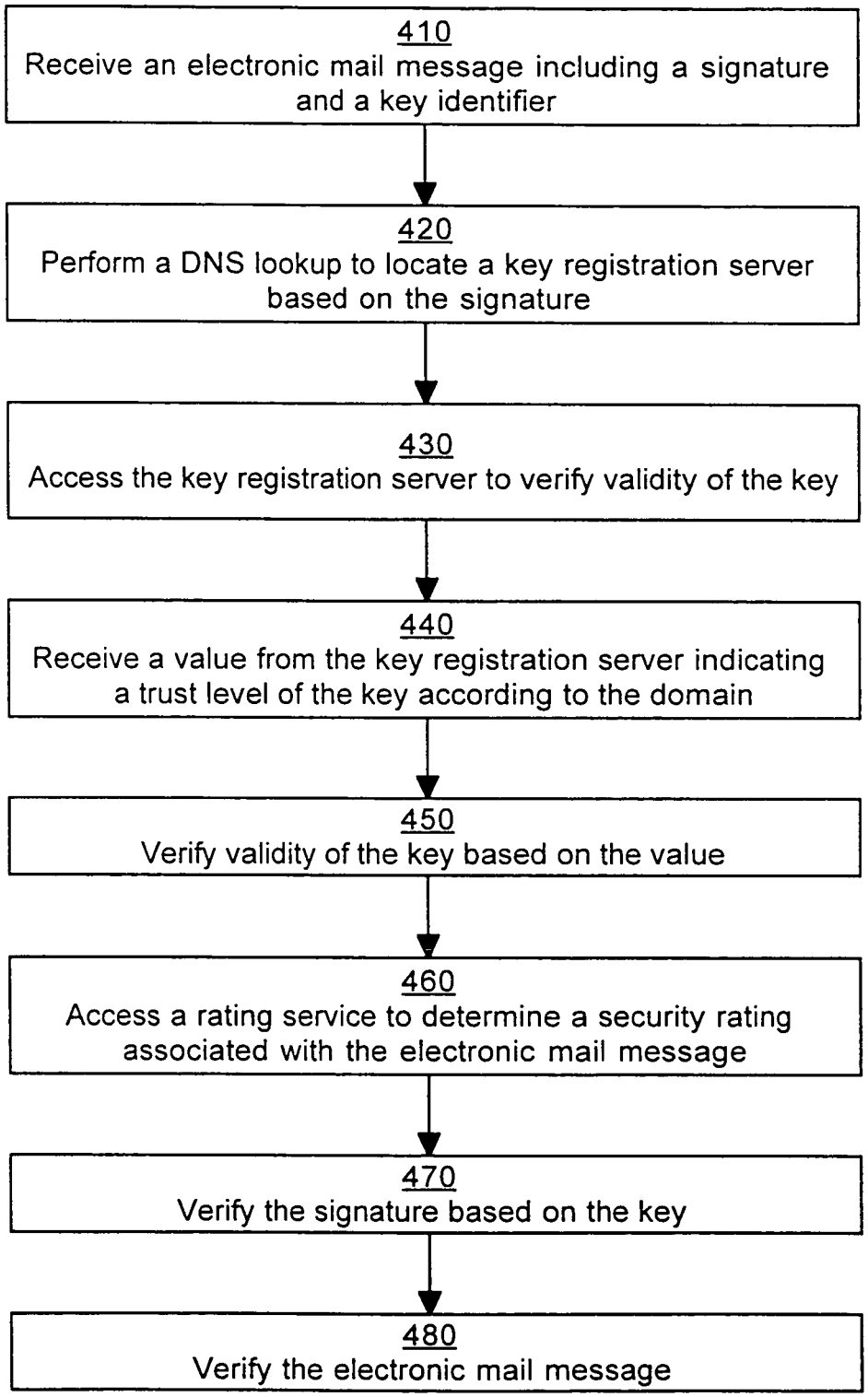
FIG. 4 is a flow chart illustrating a method for verifying identification of an electronic mail message, in accordance with one embodiment of the present invention.

FIG. 4 is a flow chart illustrating a process 400 for verifying identification of an electronic mail message, in accordance with one embodiment of the present invention. In one embodiment, process 400 is carried out by processors and electrical components under the control of computer readable and computer executable instructions. The computer readable and computer executable instructions reside, for example, in data storage features such as computer usable volatile and non-volatile memory (e.g., volatile memory 102 and non-volatile memory 103 of FIG. 1). However, the computer readable and computer executable instructions may reside in any type of computer readable medium. Although specific steps are disclosed in process 400, such steps are exemplary. That is, the embodiments of the present invention are well suited to performing various other steps or variations of the steps recited in FIG. 4. In one embodiment, process 400 is performed by MTA 240 of FIG. 2.

At step 410 of process 400, an e-mail message comprising a signature and a key identifier is received. The signature identifies a domain from which the e-mail message originated and the key identifier is for verifying the signature. In one embodiment, the key identifier identifies an associated key for verifying the signature. In another embodiment, the key identifier is a key. In one embodiment, the key is a public key that verifies the signature was generated by the same public/private key pair. In one embodiment, the e-mail message is received at an MTA (e.g., MTA 240 of FIG. 2).

At step 420, a DNS lookup is performed to locate the KRS for the domain associated with the e-mail message. The KRS is considered authoritative to verify the association of a key with an e-mail addresses in the domain. In one embodiment, to locate the KRS, the verifying MTA/MUA queries DNS with the hostname part of the envelope-from e-mail address (e.g., eng.example.com for tom@eng.example.com).

The zone file for a given domain might contain records such as the following:
example.com. IN MX 10 mail.example.com.
example.com. IN MX 10 mail2.example.com.
_krs._tcp.example.com. IN SRV 10 10 378 krs.example.com.
_krs._tcp.example.com. IN SRV 10 10 378 krs2.example.com.

At step 430, a KRS of the domain is accessed to verify authorization of the key. In one embodiment, the key is obtained from the KRS based on the key identifier. In another embodiment, where the key identifier is the key, the KRS confirms or denies the binding between the envelope-from e-mail address used by the message and the key used to sign the message. It does so by receiving a query (e.g., an authorization verification request) including the key fingerprint and the envelope-from e-mail address. In another embodiment, the query includes the envelope without the key. In another embodiment, the query receives the key for verifying authorization of the key.

At step 440, a value is received from the KRS indicating a trust level of the key according to the domain. In one embodiment, the KRS returns a numerical value based on the policy of the sending domain as to whether the key is authorized to be used in sending a message from the specified address. One exemplary policy might be as follows:

+127: Key is recognized and acceptable for the given address
0: Key is unrecognized
−127: Key is known to have been compromised; do not accept it The outgoing MTA for a domain is most likely to perform rewriting, if any, of the envelope-from address of the message (for example, to remove an unnecessary subdomain). Since the KRS and the outgoing MTA are usually under common administration, the KRS can be configured to respond appropriately to expected rewritings of the envelope-from address. The following are some excerpts from a hypothetical KRS database:

| #Rating | TTL | Address | Key | Fingerprint |
|---|---|---|---|---|
| 100 | 86400 | tom@eng.example.com | 073FDD7DD6D6EF6D1413FD7B3C577EFC | # Tom's usual address |
| 100 | 86400 | tom@example.com | 073FDD7DD6D6EF6D1413FD7B3C577EFC | # Rewriting of Tom's address |
| 100 | 86400 | dick@example.com | 91881749E520D8F53B0B91BBD8963D0D | # Dick's PC |
| 100 | 86400 | dick@example.com | 549D8949351DDA4E7C961E0F58727795 | # Dick's PDA |
| −100 | 864000 | harry@example.com | 8C8252070CA9ED401DD2EE2A7B31A8CF | # Harry's stolen PC |
| 100 | 86400 | harry@example.com | 17E64AC44DD5F8891560919D3FC6EA52 | # Harry's new PC |
| 100 | 86400 | harry@example.com | 073FDD7DD6D6EF6D1413FD7B3C577EFC | # Tom is Harry's administrative<br># assistant, so Harry allows Tom<br># to originate mail for him. |
| 100 | 604800 | *@example.com | 27985A61447CC8B514A82BFA4597174A | # Outgoing MTA key. MTA keys are<br># less likely to require rapid<br># revocation, hence the longer TTL. |
| 100 | 86400 | nobody@example.com* | | # Any key will work for this address<br># NOT RECOMMENDED! |
| −100 | 86400 | nosig@example.com | | # No signature with e-mail, where<br># domain signs all emails |

At step 450, the authorization of the key is verified based on the value. Verification of public keys from key registration servers is accomplished via a properly formatted HTTP request. A sample request might be formatted as follows:
http://krs2.example.com:378?domain=example.com
&name="john@example.com"
&keyfp="27985A61447CC8B514A82BFA4597174A"
&service="SMTP"

The fields in the query are as follows:
name: The envelope_from of the incoming mail.
keyfp: The public key fingerprint that was supplied in the X-IMAIL-SIG line.
domain: The domain corresponding to the query to be performed. This is used primarily to allow a single KRS to support multiple domains, with each domain database being independently maintained.

service: The service (e.g., SMTP) for which the query is requested.

The KRS response is the tag/value syntax with the following exemplary tags/values defined:

s: status. Follows the general convention of SMTP/HTTP status values (e.g., 200, 300, 400, 500 semantics) with the following values defined:
  200: the lookup succeeded.
  201: the lookup succeeded, but the keyfp/name combination was not found
  500: any permanent failure.

t: Time to live—Responses may be cached on the receiver so as to reduce the query/response load back to the KRS. Time to live is expressed in seconds from when the query was sent.

r: Rating—Similar to rating in the X-IMAIL-VERIFY, an integer between −127 and 127 which as the sole discretion of the entity producing the rating. For example, revoked keys from the home KRS would be given a negative rating.

m: Matches—Some key fingerprints may in fact sign for more than the single address that is present in the query. In order cut down trips to the KRS, the Matches field describes with normal Unix wildcard syntax what envelope_from patterns match this key fingerprint. For example:
  m:"*@example.com"
  would inform the cache logic of the requestor that future queries from example.com with this key fingerprint be given the same rating and time to live.

c: Comment—This is a free form string intended to convey a human readable comment about the operation.

v: Version of the responses—The value is expressed as an unsigned integer.

In one embodiment, the KRS uses a mechanism that ensures that only authorized users are able to deposit key fingerprints on the server and revoke them. This may involve a mechanism such as an authenticated HTTP exchange that requires the user's password in order to register a public key fingerprint for that user on the server. It is implicit in this key management approach that only legitimate key-to-address bindings may be registered on the key registration servers. In one embodiment, in order to prevent harvesting of e-mail addresses, a KRS will not respond with any e-mail address other than that presented in the query or a more general address (for example, when the key fingerprint corresponds to a domain MTA).

At step 460, a rating service is accessed to determine a security rating associated with the e-mail message. In one embodiment, the security rating is associated with a sender of the e-mail message. In another embodiment, the security rating is associated with the domain. It should be appreciated that step 460 is optional. It is helpful, but probably not sufficient to confirm that a message was signed using a key authorized for the stated address. This alone says nothing about the security of the originating domain's KRS, the method used to identify message senders prior to MTA message signing, and the overall character of the domain. Senders of unwanted e-mail messages are free to register domains and set up KRSs for those domains. Domains might also be set up with explicitly open key registration policies, to permit anonymous exchange of signed messages among groups of people. In either case, mail from such domains might be less valued than from domains known to be reliable.

The address rating service fulfills the need to distinguish domains with differing registration policies and/or user behavior. In one embodiment, the rating service is a third-party service, somewhat analogous to a credit bureau, which the verifier of an identified mail message may use to obtain a relative evaluation of the sending address based on criteria established by the rating bureau. In one embodiment, the rating service is operable to monitor security, policies, and user behavior of a domain. A hypothetical ratings database might include:
  90 responsible-isp.com /* ISP with good security and policies */
  40 flaky-isp.com /* ISP that isn't very responsive */
  80 tom@flaky-isp.com /* Known good user at flaky ISP */
  0 spam-marketing.com /* Known source of UCE */

In one embodiment, entries in the ratings database should be returned on the basis of longest-match. In the example above, the address "tom@flaky-isp.com" should return a rating of 80, not the value of 40 used for all other addresses in the domain. It should be appreciated that other values may be used for providing the security ratings. For example, domains or emails with poor ratings may have negative security ratings, while domains or emails with good ratings may have positive security ratings. It should be appreciated that step 460 is optional.

At step 470, the signature is verified based on the key. At step 480, the identification of the e-mail is verified. In one embodiment, the identification is verified based on the signature and the key. In another embodiment, the identification is verified based on the signature, the key and the security rating.

The described embodiments of the present invention provide a system and method for verifying identification of an electronic message. By providing a KRS for management of public keys, verification that a key used to sign an electronic mail message is valid and that the sender is authorized by the domain to send the electronic mail message from the return address may be management by a domain administrator. Furthermore, by providing a rating service for rating the security of the originating domain's KRS, a greater level of protection against unwanted e-mail messages.

Header Encapsulation

Figure 5:
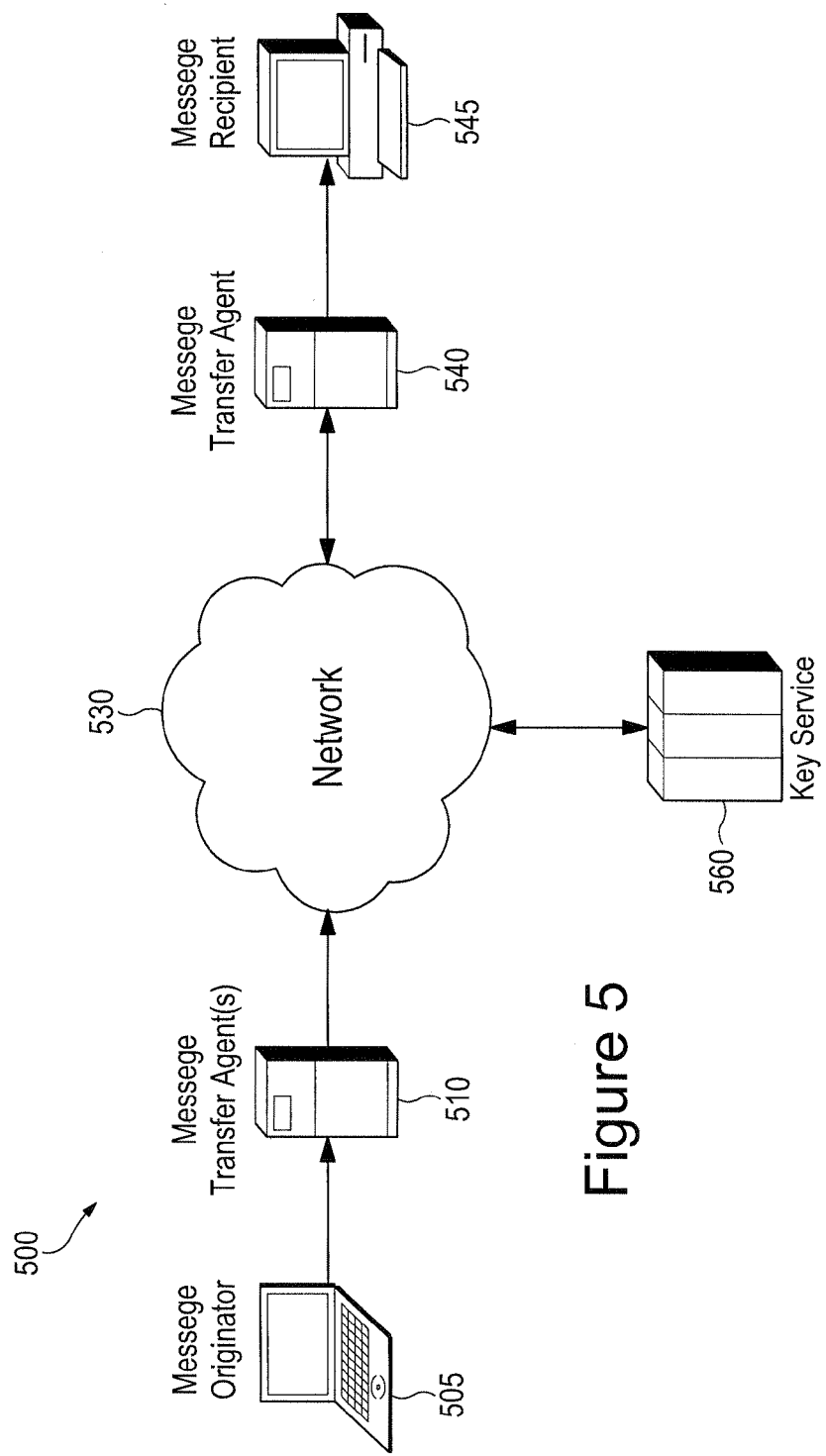
FIG. 5 is a block diagram of a system for verifying identification of an electronic message whose headers may have been modified, in accordance with an embodiment of the present invention.

FIG. 5 depicts a system 500 for verifying an electronic message comprising an encapsulated header, in accordance with an embodiment of the present invention. System 500 comprises an electronic message originator 505, a sending electronic message transfer agent 510, a network 530, a receiving electronic message transfer agent 540, and an electronic message recipient 545. The electronic message may be any message that comprises headers. In one embodiment, the electronic message is electronic mail (e-mail). In another embodiment, the electronic message may be part of a signaling protocol, such as SIP (Session Initiation Protocol), which may be used to signal Internet conferencing, IP telephony, events notification and instant messaging.

In an embodiment in which the electronic message is an e-mail, the electronic message originator 505 and recipient 545 may be electronic devices (e.g., personal computers, laptop computers, personal digital assistants, cellphones, etc.) that have a mail user agent (MUA) software program embedded in a computer readable medium. The message transfer agents 510 and 540 may be servers or other electronic devices with mail transfer agent (MTA) software programs embedded in a computer readable medium thereon. More generally, the software residing on the electronic devices (505, 510, 540, and 545) is any software capable of processing electronic messages having a modifiable header.

An electronic message that was generated at electronic message originator 505 may be transmitted by message transfer agent 510 to a destination server. Prior to transmission, copies of selected headers are included in a signature field. These copies may be in plaintext. In one embodiment, a base64 encoding is used for the header copies. In one embodiment, the header copies comprise a quoted printable format. The message transfer agent 510 may verify that the electronic message is trusted when the signature field is built. Therefore, the copy of the headers is indicative of the state of the headers when the electronic message is signed. The electronic message is signed using a private key of a public/private key pair, wherein the signature is included in the electronic message header. The signature is formed, at least in part, from the copied headers, in one embodiment. The signature is included in a signature field, in one embodiment.

The signature can be verified by using the public key of the key pair. The public key may be added to the electronic message. Alternatively, a public key identifier is added to the electronic message. The message originator 505 or the message transfer agent 510 may be operable to add the copy of the headers and sign the electronic message.

Key service 560 may either store public keys or help to retrieve the public key used to verify the signature. In one embodiment, message transfer agent 540 accesses key service 560 to perform a DNS lookup to locate the address of another server (not depicted in FIG. 5) that has the public key. In one embodiment, the DNS lookup is based on the domain name listed in the return address of the electronic message (e.g., example.com for the e-mail address joesmith@example.com). In another embodiment, the DNS lookup is based on the domain name listed in the signature header.

The message transfer agent 540 is operable to verify the message based on an analysis of the version of the header(s) in the signature field (e.g., the copy of the header) and the digital signature, in one embodiment. Alternatively, the message could be verified based on an analysis of current headers with the digital signature. However, the headers of the electronic message may have been altered between the sending agent 510 are receiving agent 540. If the signature is based on the current headers, modification of the headers will cause the verification to fail. However, some header modifications should not lead to failed verification. For example, legitimate forwarding of an e-mail message may modify the headers. However, the copy of the headers in the signature field will probably not be modified by a legitimate forwarding (or other legitimate header modification) of an electronic message. Therefore, embodiments of the present invention verify the message based on the copy of the header. Thus, modifications to the header during transit will not cause a failed verification.

However, while some header modifications are permissible, others are not. Therefore, embodiments of the present invention compare the current headers with the copy of the headers to determine differences therebetween. If they are different, a policy is applied to determine further processing of the electronic message based on the differences. For example, the differences may indicate that a tag was placed at the beginning of a header to indicate a mailing list. Such a modification may be deemed safe, wherein the message is considered to have been successfully verified. However, the modified header may be marked or modified in some fashion to warn the recipient of the header modification. For example, the modified portion of the header may be highlighted or marked in some other fashion. The processing can thus cue the recipient the message may be unsafe or unwanted (e.g., "spam"). In one embodiment, the modified header is restored to its original version (e.g., the copied header).

In one embodiment, if the verification based on the copy of the headers and the digital signature fails, the electronic message fails verification regardless of whether the copied headers match the current headers. The processing for failed verification may be in accordance with policies that are set at the discretion of an administrator. For example, the message may not be forwarded to the intended recipient or a temporary failure may be indicated until it is convenient to accept an unauthorized message.

The signature verification and the policy applied to the header comparison may take place at either or both the receiving message transfer agent 540 and/or the message recipient 545. For example, the verification of the signature may occur at one node, whereas the policy comparing the current header(s) with the copy of the header(s) may take place at another node.

Figure 6:
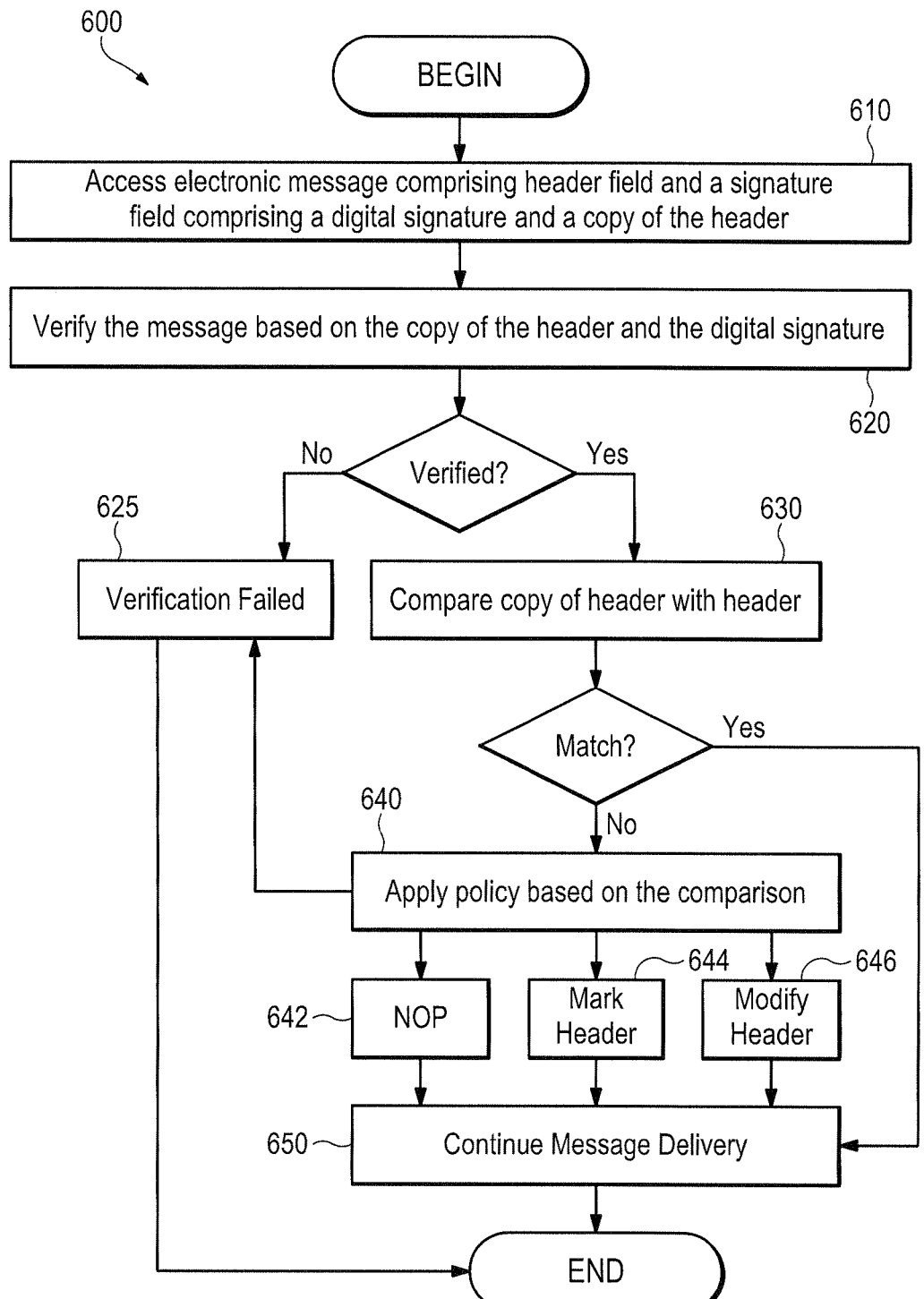
FIG. 6 is a flow chart illustrating a method of verifying an electronic message whose headers may have been modified, in accordance with an embodiment of the present invention.

FIG. 6 is a flowchart illustrating steps of a process 600 of verifying an electronic message whose headers may have been modified in transit, in accordance with an embodiment of the present invention. This embodiment allows messages with some modifications to headers to successfully verify even though the header modification would cause a failed verification based on the modified header. The types of header modifications that are permissible may be a matter of policy, which may be set by a system administrator etc. Process 600 may be used to verify any number of signed headers.

In one embodiment, process 600 is carried out by processors and electrical components under the control of computer readable and computer executable instructions. The computer readable and computer executable instructions reside, for example, in data storage features such as computer usable volatile and non-volatile memory (e.g., volatile memory 102 and non-volatile memory 103 of FIG. 1). However, the computer readable and computer executable instructions may reside in any type of computer readable medium. Although specific steps are disclosed in process 600, such steps are exemplary. That is, the embodiments of the present invention are well suited to performing various other steps or variations of the steps recited in FIG. 6. In one embodiment, process 600 is performed by message transfer agent 540 of FIG. 5. In another embodiment, process 600 is performed by message recipient 545 of FIG. 5. In still another embodiment, portions of process 600 are performed by message transfer agent 540 and message recipient 545 of FIG. 5.

At step 610 of process 600, an electronic message comprising a header (or headers) and a signature comprising a digital signature and a version (e.g., copy) of the header(s) is received. The signature may identify a domain from which the electronic message (e.g., e-mail) originated. The message also has a public key identifier. In one embodiment, the key identifier identifies a key for verifying the signature. In another embodiment, the key identifier is a key for verifying the signature. In one embodiment, the key is a public key that verifies the signature was generated by the associated private key of the private/public key pair.

The following is an exemplary electronic message, in this case an e-mail. However, the present embodiment is not limited to the electronic message being an e-mail.
Date: Wed, 18 May 2005 11:14:07-0700
From: James Smith <james@mtcc.com>
To: Mary Jane Doe <mjdoe@example.com>
Subject: Exemplary Signature Field
Signature Field: a=rsa-sha1; q=dns; l=94; t=1116440053; x=432200;

c=simple; s=mydomain; h=Subject|From|Date;
d=mtcc.com; i=James@mtcc.com
z=Subject: Exemplary Signature Field
z=From: James Smith <james@mtcc.com>
z=Date: Wed, 18 May 2005 11:14:07-0700
b=dfng/e98utFe49Je9046nHr90843u6ngbHGe90485
tnqv98nuFer984oisd89fn'daporigj098u4==

Examples of the tags and values used by the verification header are as follows:

- a=The algorithm used to generate the signature. In one embodiment, the algorithm employs encryption in accordance with RSA (Rivest, Shamir, & Adleman) and hashing in accordance with SHA-1 (Secure Hash Algorithm). However, other encryption and hashing techniques may be used. In one embodiment, a digest is computed by applying a hash function to the message body and selected headers. The digest is then encrypted with an encryption algorithm. Using a hash function is desirable to reduce the size of the signature. However, it is not required that a hash function be used.
- b=The signature data. This is the result of applying the hash function and encryption to the body and selected headers.
- c=Body canonicalization. This tag informs the verifier of the type of canonicalization used to prepare the message for signing.
- d=The domain of the signing entity. It is used to inform the receiver of the appropriate level of address that is considered the authoritative domain in this context. For example, if a message is received from jdoe@eng.example.com, the d: tag might indicate that the domain is example.com or eng.example.com. If this tag does not correspond to either the hostname of the envelope-from address or a higher-level domain, the signature may be ignored.
- h=Signed headers. This is a list of the headers that are signed. The selection of which headers to sign may be a matter of policy (set, for example, by a system administrator). This list may also indicate the order in which the signed headers are included in the signature. In one embodiment, typical signed headers include a subject, name, and date. However, any headers may be selected for signing.
- i=Identity of the user or agent (e.g., a mailing list manager) on behalf of which this message is signed.
- l=Body count. This tag informs the verifier of the number of bytes in the body of the message included in the cryptographic hash, starting from 0 immediately following the CRLF (carriage return line feed) preceding the body.
- q=A list of query methods that may be used to retrieve the public key. In this example, the method is DNS. In one embodiment, the public key is included in the message rather than an identifier to retrieve the public key.
- s=The selector subdividing the namespace for the "d=" (domain) tag.
- t: Timestamp—The time that this signature was created. In one embodiment, the format is the standard Unix seconds-since-1970 followed by a fractional number. In one embodiment, the time stamp is unique for this signing key. The intent of the fraction is to the guarantee the uniqueness of any given signature at any particular instance. The value may be expressed as an unsigned integer.
- x: Signature expiration in seconds-since-1970 format. In one embodiment, signatures are not considered valid if the current time at the receiver is past the expiration date. The value may expressed as an unsigned integer.
- z: Copied header—A copied header is a header which the sender would like to cryptographically sign. In one embodiment, there are no other headers into the cryptographic hash. The headers that are copied into the signature line may be at the discretion and local policy of the signer. In one embodiment, the headers copied include the Subject, From, and Date headers.

In step 620, the message is verified based on the copy of the headers in the signature and the digital signature. For example, the digital signature is decrypted with the public key to recover the message digest. A digest of the copy of the headers and the body of the message may be computed from the hash function specified in the message and compared to the message digest from the decrypted signature.

If the verification fails, processing of the message proceeds in accordance with the policy in place, in step 625. For example, the message may be terminated or delivery may be temporarily suspended. Any other desired actions may be taken. For example, message delivery may continue with an indication of failure to verify the signature.

If the verification in step 620 passes, the message is further processed based on a comparison of the copy of the headers with the current headers in step 630. If the two match, delivery of the message is continued, in step 650.

If the copy of the header(s) does not match the current header(s) in step 630, a policy is applied based on an analysis of the comparison to determine further processing of the message. The policy may determine whether the message should be passed to recipient or not and what action, if any, should be taken. The policy may be set as desired by a system administrator, for example. Exemplary actions that may be taken include marking the modified header (step 644), modifying the modified header (step 646), and taking no action (step 642).

If step 644 is taken, the header is marked in some fashion. For example, a portion of the modified header may be highlighted such that the message recipient is made aware of the modification.

If step 646 is taken, the header is altered in some fashion. For example, the header is restored to its original form (e.g., the copy of the headers replace the current headers in the message).

If step 642 is taken, no action is taken (NOP). Thus, the modified header is sent on to the recipient as is. As an example, this step may be taken if the modification is determined to be an accurate change in the date that reflects, for example, a time zone difference between sender and receiver. After steps 642, 644, and 646, the message delivery to the recipient continues in step 650. This may include a message transfer agent (FIG. 5, 540) transferring the message to a message recipient device (FIG. 5, 545) or the message recipient device 545 placing the message in a user's inbox or other user interface.

In some cases, the analysis of the header modification will be that the message should not be considered correctly signed, in which case step 625 is taken. Reasons that step 625 may be taken include that passing the message may be unsafe, that the message is likely to be spam or another unwanted message, or that the relevance of the header modification is unclear. Verification failure in step 625 may include delivery termination or temporary suspension. However, verification failure may also include continuing message delivery with an indication of failed signature verification.

Various embodiments of the present invention, a system, device and method for verifying identification of an electronic message, are thus described. While the present invention has been described in particular embodiments, it should be appreciated that the present invention should not be construed as limited by such embodiments, but rather construed according to the below claims.

What is claimed is:

1. A method comprising:
   receiving an electronic message over a network with a network processing device, wherein the electronic message includes a header and a signature used to verify the authenticity of the electronic message, wherein the signature includes a copy of an original version of the header included in the electronic message when the electronic message is initially transmitted over the network;
   comparing the copy of the original version of the header in the signature to the header of the electronic message received by the network processing device;
   determining whether the header of the electronic message was modified during transmission over the network based on the comparison; and
   forwarding the electronic message to a recipient based, at least in part, on any modifications to the electronic message.

2. The method of claim 1 further comprises dropping the electronic message based on one or more modifications to the header of the electronic message during transmission to the network processing device over the network.

3. The method of claim 1 further comprises marking the electronic message to alert the recipient of one or more modifications to the header of the electronic message during transmission to the network processing device over the network.

4. The method of claim 1 further comprises in response to a modification of the header of electronic message, replacing the header of the electronic message with the copy of the original version of the header included in the electronic message when the electronic message is initially transmitted over the network.

5. The method of claim 1, wherein forwarding the electronic message to a recipient further comprises forwarding the electronic message to a message user agent device.

6. The method of claim 1, wherein forwarding the electronic message to a recipient further comprises forwarding the electronic message to a display device for presentation on a graphical user interface.

7. An apparatus comprising a computer readable storage memory including instructions configured to cause a processing system to perform operations comprising:
   receiving an electronic message over a network, wherein the electronic message includes a header and a signature used to verify the authenticity of the electronic message, wherein the signature includes a copy of an original version of the header included in the electronic message when the electronic message is transmitted over the network;
   comparing the copy of the original version of the header in the signature to the header of the electronic message;
   determining whether the header of the electronic message receive was modified during transmission to the apparatus over the network based on the comparison; and
   forwarding the electronic message to a recipient based, at least in part, on any modifications to the electronic message.

8. The apparatus of claim 7, wherein the processing system is configured to drop the electronic message based on the one or more modifications to the header of the electronic message during transmission over the network.

9. The apparatus of claim 7, wherein the processing system is configured to mark the electronic message to alert the recipient of the one or more modifications to the header of the electronic message during transmission over the network.

10. The apparatus of claim 7, wherein the processing system is configured to replace the header of the electronic message with the original version of the header.

11. The apparatus of claim 7, wherein the processing system is configured to forward the electronic message to a message user agent device.

12. An apparatus comprising:
    a processor;
    a computer readable storage medium coupled to the processor, wherein the computer readable storage medium includes instructions that, when executed by the processor, cause the processor to receive an electronic message over a network, wherein the electronic message includes a header and a signature having a copy of an original version of the header included in the electronic message when the electronic message is transmitted over the network, wherein the processor is configured to compare the original version of the header in the signature to the header of the electronic message, wherein the processor is configured to determine whether the header of the electronic message was modified during transmission to the apparatus over the network based on the comparison, and wherein the processor is configured to forward the electronic message to a recipient based, at least in part, on any modifications to the electronic message.

13. The apparatus of claim 12, wherein the processor is configured to drop the electronic message based on the one or more modifications to the header of the electronic message during transmission over the network.

14. The apparatus of claim 12, wherein the processor is configured to mark the electronic message to alert the recipient of the one or more modifications to the header of the electronic message during transmission over the network.

15. The apparatus of claim 12, wherein the processor is configured to replace the header of the electronic message with the original version of the header.

16. The apparatus of claim 12, wherein the processor is configured to forward the electronic message to a display device for presentation on a graphical user interface.

17. A system comprising:
    a network interface to receive an electronic message over a network, wherein the electronic message includes a header and a signature having a copy of an original version of the header included in the electronic message when the electronic message was initially transmitted over the network;
    means for comparing the copy of the original version of the header in the signature to the header of the electronic message;
    means for determining whether the header of the electronic message was modified during transmission over the network based on the comparison; and
    means for forwarding the electronic message to a recipient based, at least in part, on any modifications to the electronic message.

18. The system of claim 17, further comprising means for marking the electronic message to alert the recipient of the one or more modifications to the header of the electronic message during transmission over the network.

19. The system of claim 17, further comprising means for replacing the header of the electronic message with the original version of the header.

20. The system of claim 17, wherein the means for forwarding is configured to forward the electronic message to a message user agent device.

* * * * *